United States Patent [19]

Hoon, Jr.

[11] 3,758,087
[45] Sept. 11, 1973

[54] CONTACT DEVICE
[75] Inventor: Harry E. Hoon, Jr., Strongsville, Ohio
[73] Assignee: Envirotech Corporation, Salt Lake City, Utah
[22] Filed: Apr. 20, 1971
[21] Appl. No.: 135,586

[52] U.S. Cl. ............................................. 261/94
[51] Int. Cl. .............................................. B01t 3/04
[58] Field of Search .................. 161/16; 261/94, 95; 273/62, 58 B, 58 BA, 199; 156/146, 147

[56] References Cited
UNITED STATES PATENTS

| 2,198,861 | 4/1940 | Chamberlain et al. | 261/95 |
| 2,212,932 | 8/1940 | Fairlie | 261/94 |
| 2,925,678 | 2/1960 | Burnbaum | 161/16 |
| 3,364,656 | 1/1968 | Whiton et al. | 261/94 |
| 3,543,937 | 12/1970 | Choun | 261/95 |
| 2,597,704 | 5/1952 | Carlson | 273/199 R |

Primary Examiner—Bernard Nozick
Attorney—Robert R. Finch and Robert E. Krebs

[57] ABSTRACT

A filter device in the form of a perforated, hollow spherical contact article for use in an apparatus for intercontacting fluid streams is described and illustrated. Preferably, the article comprises a pair of similarly shaped polymeric hemispheres, each of which has a plurality of spaced, radially extending portions adjacent the mating edge. In this preferred form, the hemispheres are joined together at these radially extending portions so as to provide a pair of hemispheres joined at spaced intervals to form a sphere.

1 Claim, 4 Drawing Figures

PATENTED SEP 11 1973  3,758,087

INVENTOR.
Harry E. Hoon, Jr.
BY
Teare, Teare & Sammon
Attorneys

CONTACT DEVICE

BACKGROUND OF THE INVENTION

The invention relates generally to contact articles for use in an apparatus for intercontacting fluid streams. More particularly, the invention relates to hollow, perforated contact spheres for use in towers for the countercurrent contacting of gas and liquid streams.

Previously, contact articles have taken many different forms such as spheres, hemispheres, non-hemispherical sphere segments, and more complex shapes. These articles might be either hollow, solid, or porous. The more complex the shape, the more difficult or expensive it was to form the article. Heretofore, when component elements were joined, a generally continuous joint was used to provide strength. Properly aligning these elements during joint formation was difficult, particularly with articles with curved peripheries.

The following exemplifies previous constructions: U.S. Pat. No. 3,432,994 to Whiton et al.

SUMMARY OF THE INVENTION

Generally, the present invention comprises a perforated, hollow, spherical contact article which is formed by a pair of similarly shaped hemispheres which are joined at spaced intervals. This joinder solely at spaced intervals is provided by a plurality of symmetrically disposed radially extending portions on each hemisphere. Alternatively, these portions may extend radially inwardly of the mating edge surface of each hemisphere and lie within the peripheral confines of the completed sphere or may extend radially outwardly from the edge surface and lie outside the peripheral confines.

Accordingly, it is an object of the present invention to provide a contact article for use in an apparatus for intercontacting fluid streams, particularly an article whose component elements need to be joined only at spaced intervals. It is a further object to provide a contact article which can be formed from separate components which are easily aligned and joined together to fabricate the completed article. It is an additional object to provide a contact article whose component elements can be easily and inexpensively formed. Further objects of the invention reside in the provision of an improved filter or contact element that is of a durable, yet lightweight construction and which comprises at least two hollow components or sections only partially, yet fixedly joined together and thus provides both exterior and interior surfaces for contact with a countercurrent fluid stream, for example. A particular advantage of this construction resides in the superior strength for holding the parts together while eliminating hang-ups or interlocking of the same during operation, as when employed in a floating contact bed or the like. The foregoing objects, as well as additional objects and advantages may be found by reference to the accompanying drawings and discussion of the present invention.

DESCRIPTION OF THE PREFERRED EMBODIMENTS

Figure 1:
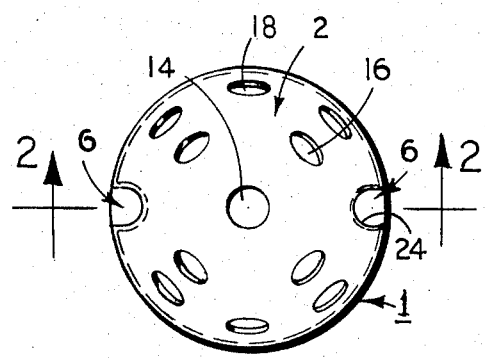
FIG. 1 is a top plan view of the preferred embodiment of the spherical contact article of the present invention.
Figure 2:
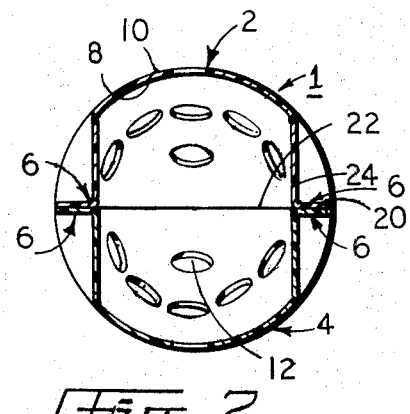
FIG. 2 is a horizontal section view of the embodiment of FIG. 1 taken along the line 2—2.

The contact article of the present invention, generally designated as 1 and illustrated in FIGS. 1 and 2 in its preferred embodiment, comprises a hollow, perforated, polymeric sphere formed by a pair of similarly configured hemispheres 2 and 4. Each of these hemispheres is provided with spaced, radially extending tab-like portions 6 adjacent the edge surface which mates with that of the remaining hemisphere to form the spherical article 1. Since these radially extending portions 6 provide the sole means of joinder between the hemispheres 2 and 4, they provide joinder of the hemispheres at spaced intervals or a partial joinder with respect to the periphery of the mating surfaces.

The article 1 of the present invention is preferably utilized as an impingement or contact element in apparatus in which fluid streams are contacted with each other. For example, the article 1 may be used as an impingement element in a tower for the countercurrent contacting of gas and liquid streams, such as in a gas cleaning apparatus.

Each hemisphere, such as 2 or 4, of the present invention is defined by an interior generally spherically concave surface 8 (FIG. 2) and an exterior generally spherically convex surface 10 (FIG. 2) to provide a thin-walled construction to the completed spherical article 1. A plurality of perforations or apertures, such as that designated by 12, extend between the surfaces 8 and 10 to communicate the interior of the article 1 with the external environment thereby increasing the effective surface area of the article 1. In the form shown, these apertures, such as 12, are circular in configuration. Preferably, the apertures are symmetrically disposed on each hemisphere and in the form shown in FIGS. 1 and 2 are arranged in an array eleven holes per hemisphere with a single centrally disposed aperture 14 (FIG. 1), an intermediate circle 16 of four and an outer circle 18 of six. Each hemisphere is preferably made by thermoplastic shaping of a synthetic polymeric or plastic material such as polyethylene or polypropylene.

In the embodiment illustrated in FIGS. 1 and 2, the radially extending portions 6 comprise a pair of oppositely disposed planar tabs 20 which extend inwardly of the periphery of each hemisphere, such as 2 or 4, in a plane which is at least parallel to the plane of mating edge surface 22. Preferably, the lower surface of each tab 20 is coplanar with the mating edge surface 22 of its associated hemisphere to provide additional surface contact between mating hemispheres. As shown in FIGS. 1 and 2, each tab 20 comprises the lower extremity of a partially cylindrically concave recess 24 which extends within the confines of the periphery of each hemisphere in a direction perpendicular to both the plane of the mating edge surface 22 and the plane of the associated tab 20 itself. Due to the symmetric disposition of the tabs 20 and their associated recesses 24 and the similarity of configuration of each hemisphere, the hemispheres are easily aligned and joined at just the limited areas where the tabs 20 confront. By providing symmetrically disposed concave recesses 24 a male aligning tool can be used to grip the hemispheres 2 and 4 and to properly align them for joinder. Preferably, this joinder is effected by heat or solvent welding.

Figure 3:
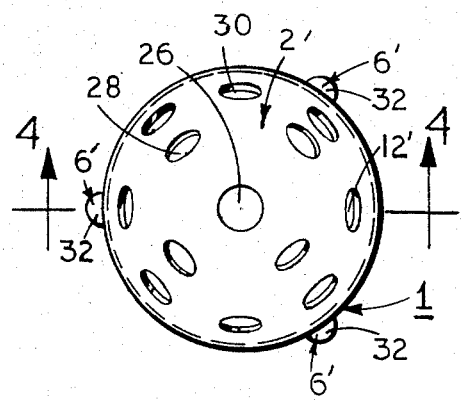
FIG. 3 is a top plan view of a further embodiment of the article of the present invention.
Figure 4:
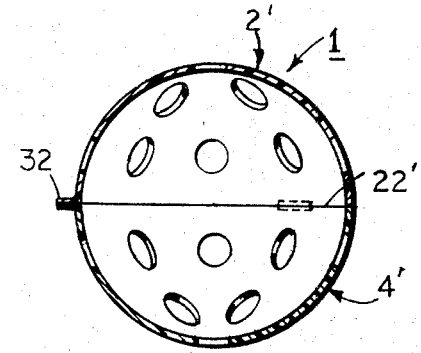
FIG. 4 is a horizontal section view of the embodiment of FIG. 3 taken along the line 3—3.

Turning now to the embodiment of FIGS. 3 and 4, this embodiment differs from that of FIGS. 1 and 2 in only two respects—the number and disposition of the apertures 12' and the configuration and orientation of the radially extending portions 6'. In this embodiment, thirteen apertures are provided in the following array: a centrally disposed aperture 26, an intermediate circle 28 of four apertures, and an outer circle 30 of eight apertures. In this instance, the radially extending portions 6' comprise three symmetrically disposed planar tabs 32 which extend normally outwardly from the periphery of each hemisphere, such as 2' or 4', in a plane which is at least parallel to the plane of the mating edge surface 22'. Preferably, the lower surface of each tab 32 is coplanar with the plane of the surface 22'. In top plan, each tab 32 appears as the segment of a circle. In this embodiment the means for hemisphere joinder (tabs 32) are disposed generally exteriorly of each hemisphere's periphery; whereas, in the embodiment of FIGS. 1 and 2, these means are disposed generally inwardly of the periphery. These exterior joinder means may be used for joining the hemispheres 2' and 4' at spaced, limited areas in a manner similar to that used for the FIGS. 1 and 2 embodiment except for the use of a female aligning tool.

While the use of hemispheres has been disclosed to form the spherical contact article 1, it should be understood that complementary sphere segments which, when assembled, form a sphere may be used when desired.

By the foregoing elements and their interrelationship, a contact article which is more readily manufactured is produced; errors in misaligning segments are minimized; and the component elements are more easily formed.

I claim:

1. A generally spherical contact article for use as packing in an apparatus for cleaning a contaminated gaseous stream by countercurrently contacting the gaseous stream with a liquid stream, said article comprising:
   a. A pair of similarly sized hollow hemispheres, the walls of which are perforated;
   b. Each of said hemispheres including spaced-apart tab portions which extend inwardly from the equatorial edge of the hemisphere substantially coplanar with that equatorial edge, said tab portions being arranged on one of said hemispheres of said pair in a pattern which is symmetric with the arrangement of tabs on the other said hemisphere;
   c. Said pairs of said hemispheres being joined to form a sphere with associated pairs of said tabs juxtaposed within the general peripheral confines of the article;
   d. Each of said hemispheres further including recesses which are formed into the walls thereof and which are associated with each of said tabs, said recesses extending generally perpendicular to the plane of the tabs.

* * * * *